March 29, 1927.

G. N. PORTER

SAFETY HOOK

Filed July 21, 1926

G. N. Porter
INVENTOR

March 29, 1927. 1,622,971
G. N. PORTER
SAFETY HOOK
Filed July 21, 1926 2 Sheets-Sheet 2
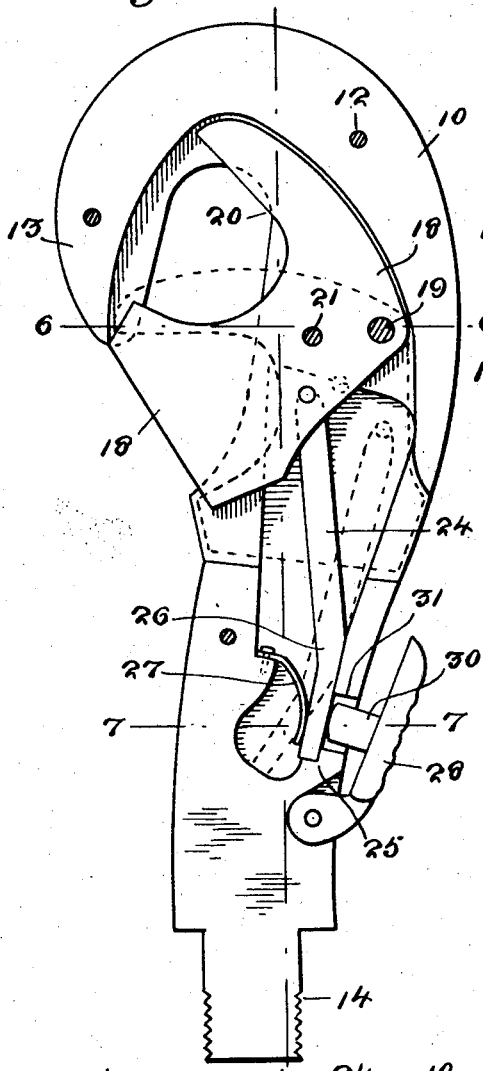
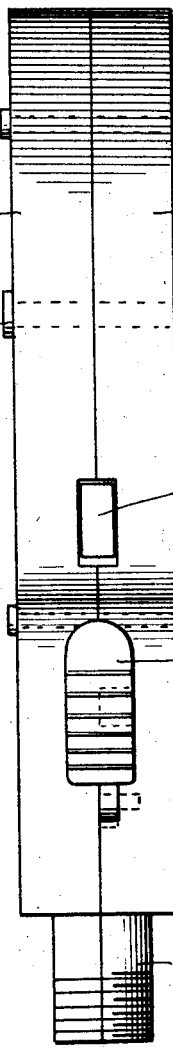
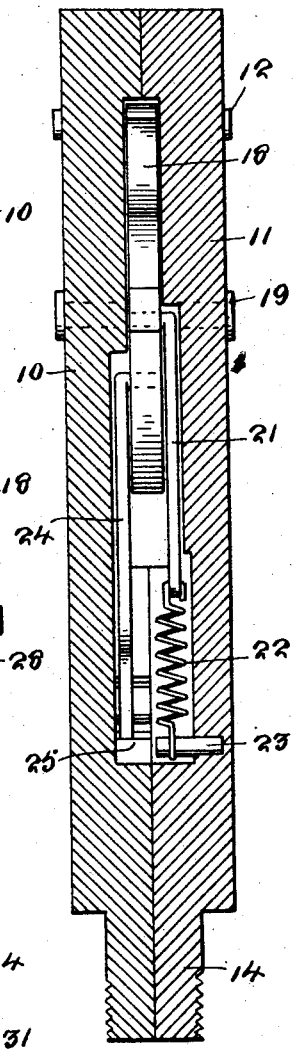
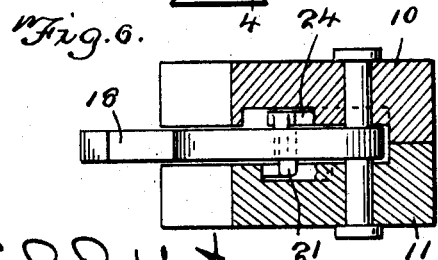
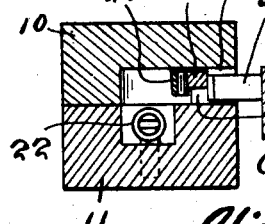
G. N. Porter
INVENTOR Patented Mar. 29, 1927.

1,622,971

UNITED STATES PATENT OFFICE.

GEORGE NEWTON PORTER, OF OILTON, OKLAHOMA.

SAFETY HOOK.

Application filed July 21, 1926. Serial No. 124,027.

This invention relates to hooks adapted for any and all uses for which such a device is capable, the object of the invention residing in a novel construction of means whereby the object with which the hook is used is automatically locked associated therewith, and removed from the hook when the locking means is released.

In carrying out the invention, I contemplate the use of a pivoted locking dog designed to receive the object with which the hook is used, and automatically move the dog to an active position to prevent the object from being casually separated from the hook under any conditions, with means for releasing and returning the locking dog to its normal position, during which operation of the dog the object is disengaged from the hook.

The nature and advantages of the invention will be better understood when the following detail description is read in connection with the accompanying drawings, the invention residing in the construction, combination and arrangement of parts as claimed.

In the drawings forming part of this application like numerals of reference indicate similar parts in the several views and wherein:

Figure 3 is a view similar to Figure 2 with the other side of the hook removed to show the other side of the dog and the locking means therefor.

Figure 4 is a sectional view on line 4—4 of Figure 3.

Figure 5 is an edge elevation of the hook.

Figure 6 is a sectional view on line 6—6 of Figure 3.

Figure 7 is a sectional view on line 7—7 of Figure 3.

Figure 1:
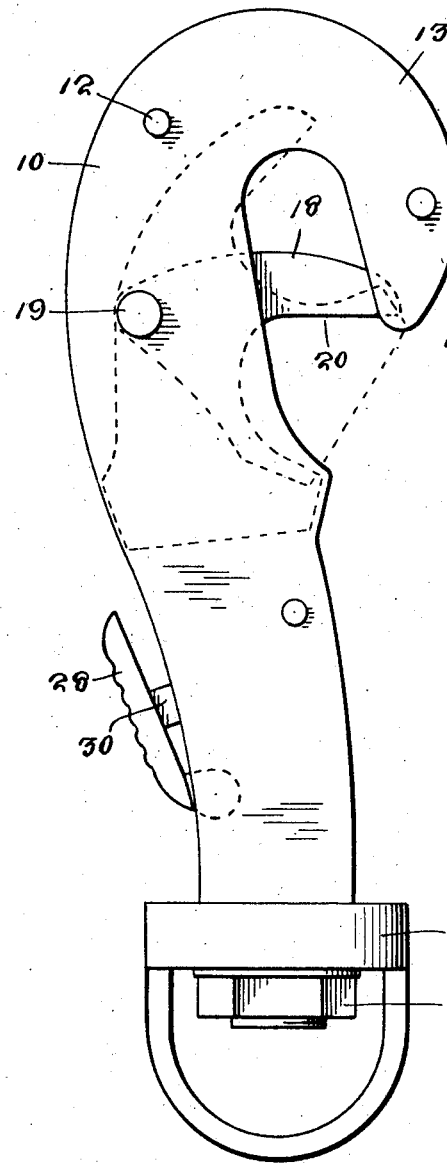
Figure 1 is a side elevation of the hook showing the active and inactive positions of the locking dog.

The hook is preferably made up in two halves or sections indicated at 10 and 11 respectively and these sections are held together by any suitable fastening means such as bolts or the like indicated at 12. Each section is formed to provide the bill 13 of the hook, while the adjacent or confronting sides of the respective sections are recessed as shown in Figure 4 to accommodate the movable parts of the device to be hereinafter described. Each section of the hook has a reduced semi-cylindrical threaded extension 14, which when the sections are associated accommodate a nut 15 utilized to hold a collar 16 mounted on the shaft of the hook, and upon which collar is swivelly or rotatably mounted a yoke or the like 17. This structure is clearly illustrated in Figures 1 and 2.

Figure 2:
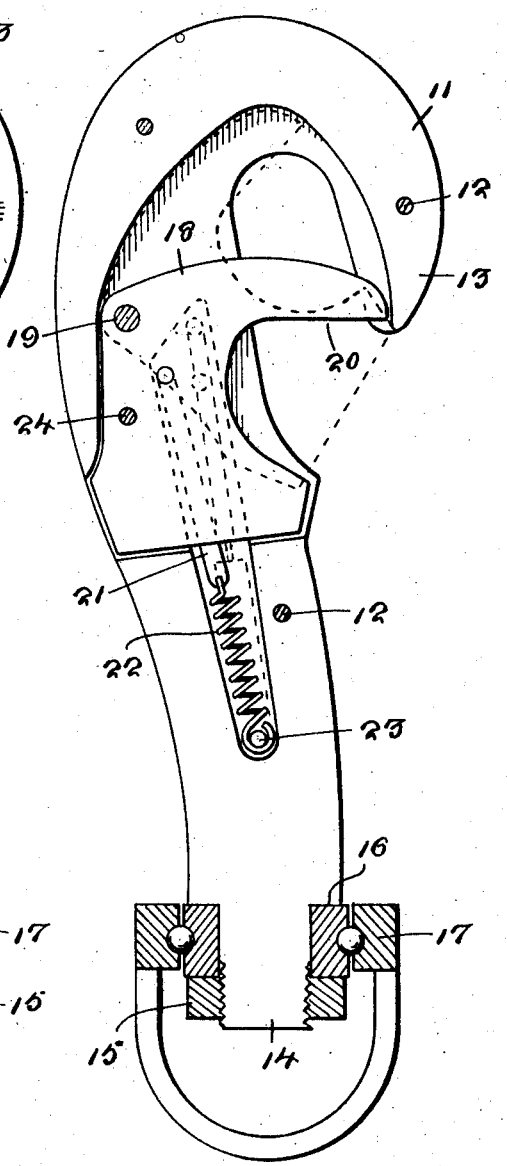
Figure 2 is a similar view with one side of the hook removed to show how the locking dog and its operating means is arranged within the hook.

Pivoted between the sections of the hook is a locking dog 18, the latter being pivoted at 19, and cut away to provide a substantially U-shaped opening or portion 20 which normally occupies the position illustrated by full lines in Figures 1 and 2. In this position of the locking dog, the cut away or U-shaped portion is arranged in the mouth of the bill, so that the object to be associated with the hook is received by this U-shaped or cut away portion 20. Pivoted to one side of the locking dog 18 is a link 21 which is capable of sliding movement longitudinally of the hook, and has one end connected to the adjacent end of a coil spring 22, the other end of which is fixed as at 23 to the shank of the hook. This spring 23 together with the link 21 functions to hold the locking dog in its normal position as just mentioned, and when the locking dog is swung to its active position illustrated by dotted lines in Figures 1 and 2, the spring 23 is placed under tension. The locking dog is moved to its active position by the object incident to the association of the object with the bill of the hook as will be readily understood, the active position of the locking dog being such as to completely close the bill of the hook in a manner to prevent casual separation of the object from the latter under any and all circumstances.

Pivoted on the other side of the locking dog is a locking bar 24 which is also mounted for sliding movement longitudinally of the shank of the hook, and adapted to repose upon a shoulder 25 formed on one of the sections, when the locking dog is in its active position, and hold said dog in this position until such times as it is desired to release the same. The lower end of this locking bar is slightly offset as at 26 to properly engage the adjacent wall of the recess in which the locking dog operates as clearly illustrated in Figure 3, the locking bar being subject to the influence of a spring 27 which bears against one side of the bar 24 to force it in the direction of the locking shoulder 25. When the locking dog is in its normal position, the locking bar 24 occupies the position shown by dotted lines in Figure 3, wherein it will be noted that the lower end of the bar is spaced from and beneath the shoulder 25. However when the locking dog is swung upon its pivot 19 to its active position, the locking bar is moved with the dog, until the lower end of the bar is positioned adjacent the shoulder 25, whereupon the spring 27 moves the locking bar to its position upon said shoulder, thereby holding the locking dog against movement while in its active position.

While any suitable means may be employed to effect a release of the dog 18, I preferably make use of a thumb engaging plate 28 which is pivoted upon the shank of the hook as at 29, while projecting from the plate 28 is a short plunger 30 operating within an opening 31 in the adjacent side of the shank and contacting the locking bar 24 when the latter is in the position shown by full lines in Figure 3. Consequently to release the locking dog it is only necessary to press upon the plate 28, whereupon the plunger 30 forces the bar 24 off the shoulder 25, at which time the spring 23 is called into use to automatically return the locking dog to its normal position. During this movement of the dog, the object associated therewith is separated from the hook by being moved with the dog through the opening in the bill of the hook.

While it is believed that from the foregoing description, the nature and advantages of the invention will be readily apparent, I desire to have it understood, that I do not limit myself to what is herein shown and described and that such changes may be resorted to when desired as fall within the scope of what is claimed.

What is claimed is:

1. In combination, a hook, a dog pivoted thereon and having a U-shaped portion, resilient means for normally holding the dog positioned with its U-shaped portion in the mouth of the hook and adapted to be moved to a position to close said hook incident to the association of an object with the latter, a shoulder formed on the shank of the hook, a pivoted locking rod carried by said dog and adapted to repose upon the shoulder to hold the dog in its adjusted position, means for moving the bar on said shoulder as the dog is moved to its adjusted position, and means for effecting a release of said locking bar to allow the dog to automatically return to its normal position under the influence of said resilient means.

2. In combination, a hook, a locking dog pivoted thereon and including a U-shaped portion, resilient means for normally holding the dog positioned with its U-shaped portion in the mouth of the hook and adapted to be moved to a position to close said hook incident to the association of an object with the latter, a locking bar pivoted on said dog and movable therewith, a shoulder formed on the hook and resilient means for moving said locking bar on to said shoulder with the adjustment of said dog, whereby the latter is held immovable in its adjusted position, a pivoted plate, and a plunger projecting from the plate to effect a release of said locking bar when said plate is depressed, thereby allowing said dog to automatically return to its normal position under the influence of said resilient means.

3. In combination, a hook comprising two companion sections, means for connecting said sections together, the adjacent sides of said sections having recesses formed therein, a locking dog pivoted between said sections and having a U-shaped portion, resilient means for normally holding the dog positioned with its U-shaped portion in the mouth of the hook and adapted to be moved to a position to close said hook incident to the association of an object with the latter, cooperating means carried by said dog and hook for holding the dog immovable in its adjusted position, said means operating between the sections of said hook, and means including a pivoted thumb engaging plate for effecting a release of said dog and allow its automatic return to normal position by said resilient means.

4. In combination, a hook including a bill, a locking dog pivoted thereon and having a U-shaped portion, a link pivotally connected with said dog and arranged for movement longitudinally of the shank of the hook, a spring connecting one end of the dog with said shank and operating to normally hold the dog positioned with its U-shaped portion in the mouth of the hook, said dog being adapted to be moved to a position to close the hook incident to the association of an object with the latter, a shoulder formed on the shank of the hook, a pivoted locking rod carried by said dog, means for moving said rod on said shoulder as the dog is moved to its active position, and thumb actuated means for effecting a release of said dog to permit it to automatically return to its normal position.

In testimony whereof I affix my signature.

GEORGE NEWTON PORTER.